United States Patent
Ishihara et al.

(10) Patent No.: US 10,330,142 B2
(45) Date of Patent: Jun. 25, 2019

(54) CRANKSHAFT FOR RECIPROCATING ENGINE

(71) Applicant: NIPPON STEEL & SUMITOMO METAL CORPORATION, Tokyo (JP)

(72) Inventors: Koichiro Ishihara, Kyoto (JP); Kenji Imanishi, Kishiwada (JP); Ken Yoshino, Guangdong (CN); Kunihiro Yabuno, Matsubara (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/501,013

(22) PCT Filed: Aug. 6, 2015

(86) PCT No.: PCT/JP2015/003952
§ 371 (c)(1),
(2) Date: Feb. 1, 2017

(87) PCT Pub. No.: WO2016/021201
PCT Pub. Date: Feb. 11, 2016

(65) Prior Publication Data
US 2017/0234360 A1     Aug. 17, 2017

Related U.S. Application Data

(63) Continuation of application No. PCT/JP2015/003952, filed on Aug. 6, 2015.

(30) Foreign Application Priority Data

Aug. 7, 2014   (JP) .................................. 2014-161654

(51) Int. Cl.
F16C 3/06     (2006.01)
F16C 3/08     (2006.01)
F16C 3/20     (2006.01)

(52) U.S. Cl.
CPC .................. *F16C 3/06* (2013.01); *F16C 3/08* (2013.01); *F16C 3/20* (2013.01)

(58) Field of Classification Search
CPC ................. F16C 3/08; F16C 3/06; F16C 3/20
See application file for complete search history.

(56) References Cited

U.S. PATENT DOCUMENTS 276,910 A * 5/1883 Skinner ................. F16F 15/283
                                                              74/603
1,337,081 A * 4/1920 Kuem ...................... F16C 3/20
                                                              29/888.08

(Continued)

FOREIGN PATENT DOCUMENTS

JP     58-030020         8/1983
JP     60104812 A *      6/1985   ................ F16C 3/06

(Continued)

*Primary Examiner* — Thomas C Diaz
(74) *Attorney, Agent, or Firm* — Clark & Brody

(57) ABSTRACT

A crankshaft includes journals that define a central axis of rotation; crank pins that are eccentric with respect to the journals; crank arms connecting the journals to the crank pins; and counterweights integrated with the crank arms. Each of the crank arms has recesses in a surface adjacent to the crank pin. The recesses are disposed inward of peripheral regions in both sides along an edge of the surface, and are disposed along the peripheral regions. The crankshaft has a reduced weight, an increased torsional rigidity and an increased flexural rigidity.

8 Claims, 9 Drawing Sheets

(56) References Cited

U.S. PATENT DOCUMENTS

| | | | | |
|---|---|---|---|---|
| 4,356,741 A | * | 11/1982 | Schopf | F16C 3/08 29/6.01 |
| 5,435,059 A | * | 7/1995 | Chawla | F16C 3/20 29/888.08 |
| 2006/0191370 A1 | | 8/2006 | Nommensen | |

FOREIGN PATENT DOCUMENTS

| | | | | |
|---|---|---|---|---|
| JP | 2000320531 A | * | 11/2000 | F16C 3/08 |
| JP | 2003-232331 | | 8/2003 | |
| JP | 2004-538429 | | 12/2004 | |
| JP | 2004-538430 | | 12/2004 | |
| JP | 2010-230027 | | 10/2010 | |
| JP | 2012-007726 | | 1/2012 | |
| JP | 4998233 | | 8/2012 | |
| WO | 2009/120715 | | 10/2009 | |

\* cited by examiner (a)

(b)

(a) Rectangular Cross Section
(b) Projected Cross Section
(c) Recessed Cross Section (a) Rectangular Cross Section
(b) Projected Cross Section
(c) Recessed Cross Section

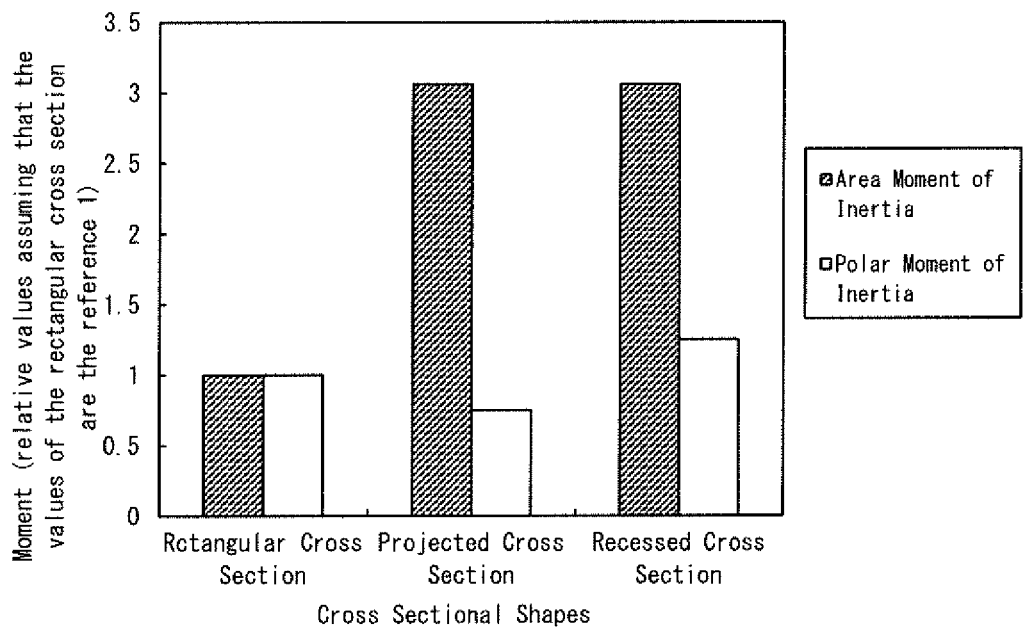

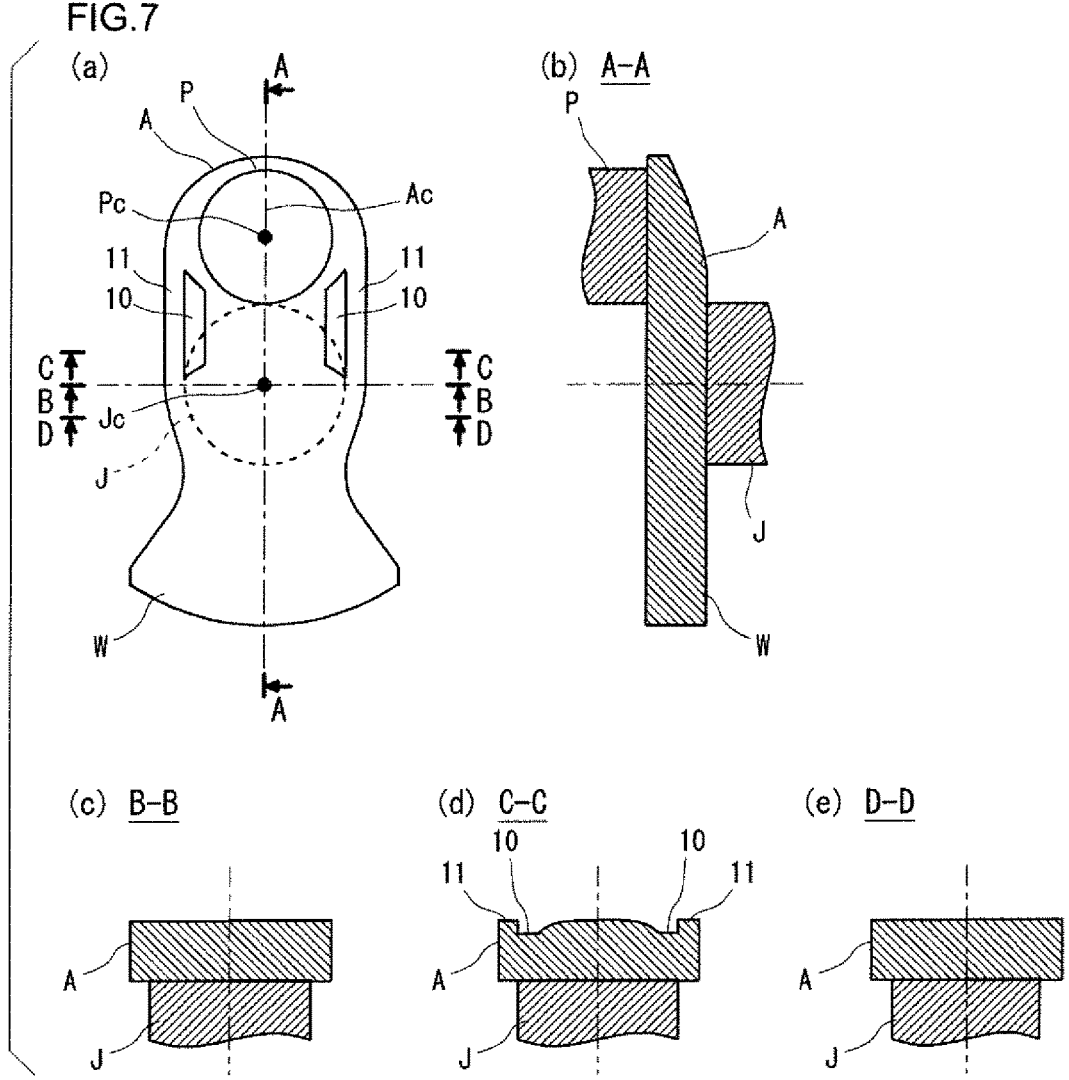

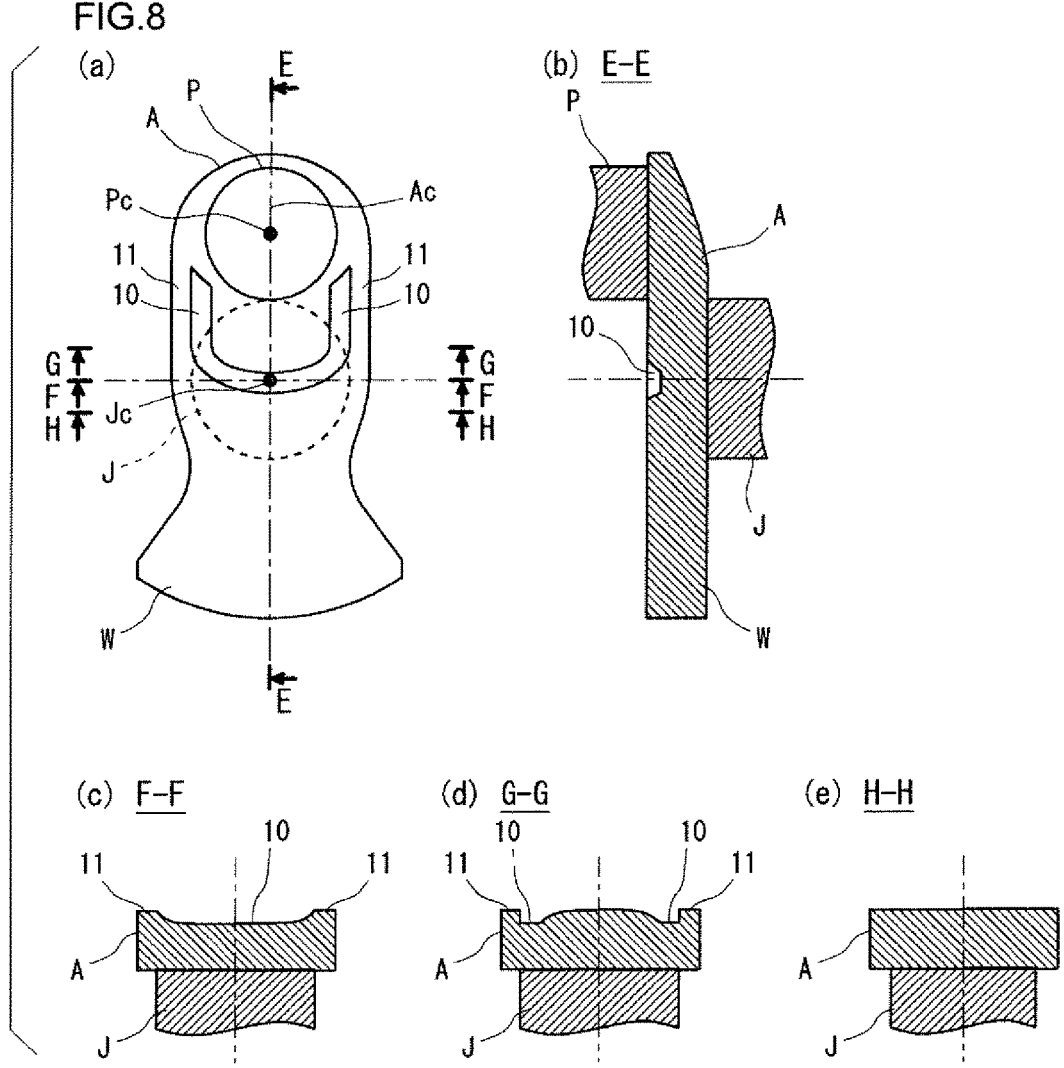

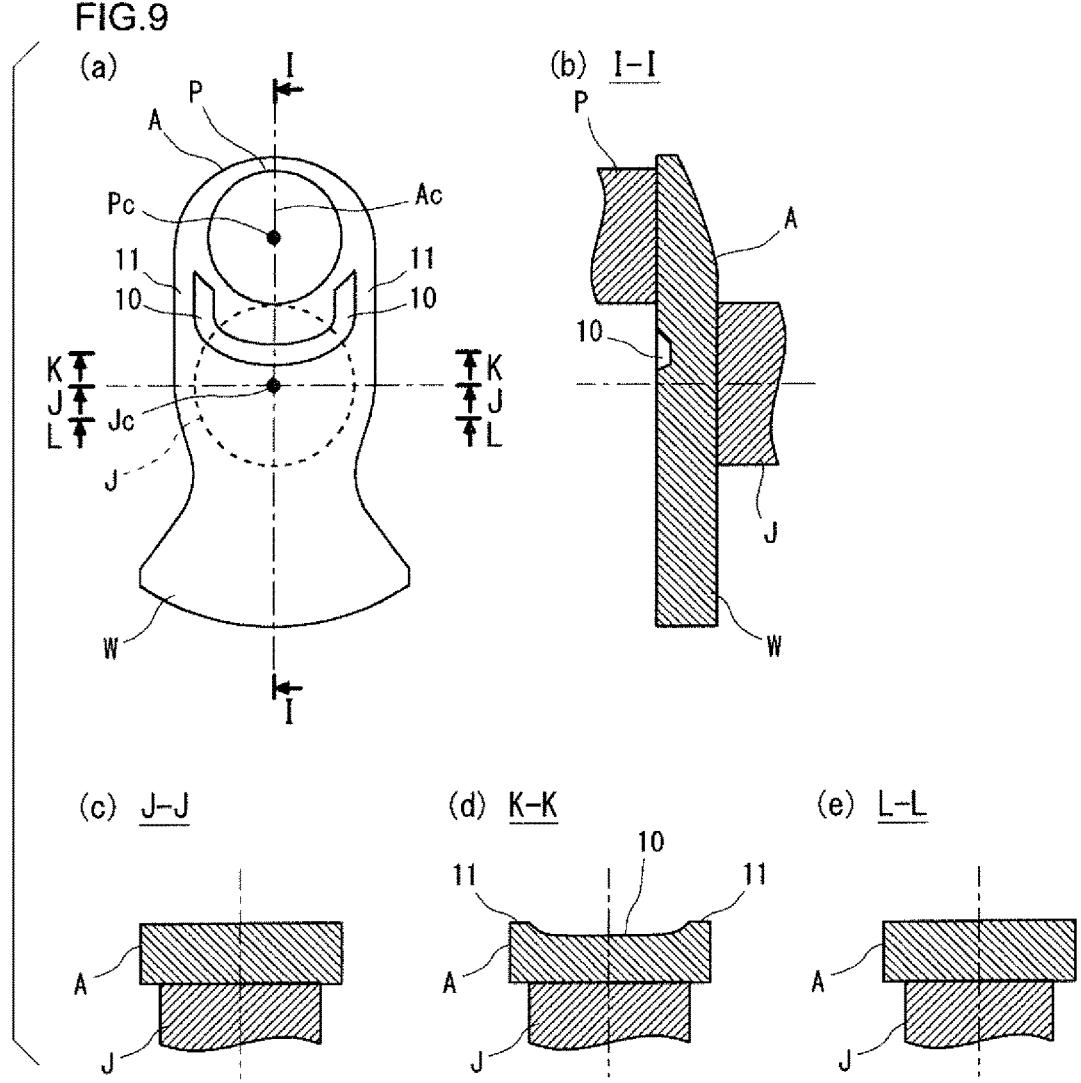

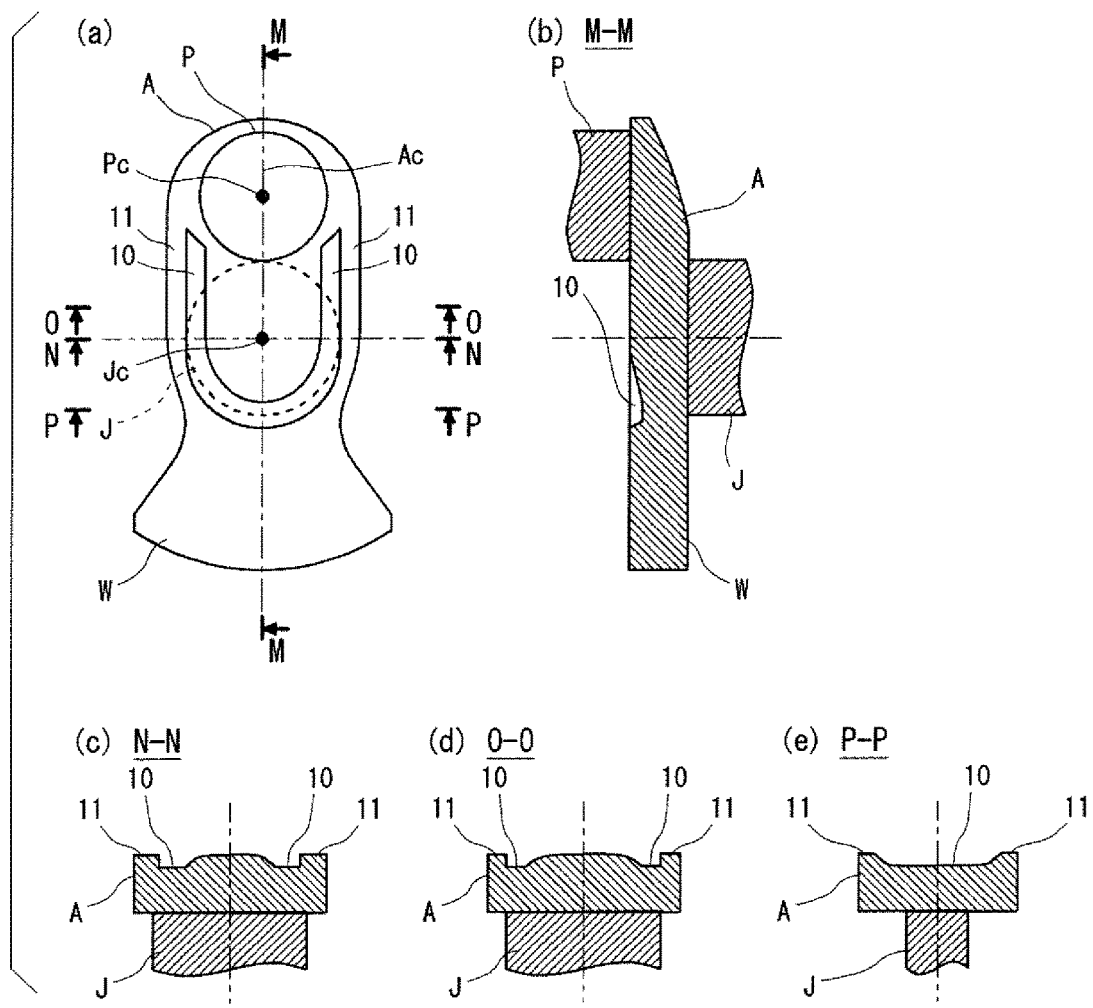

CRANKSHAFT FOR RECIPROCATING ENGINE

TECHNICAL FIELD

The present invention relates to crankshafts to be mounted in reciprocating engines such as automotive engines, marine engines, and multiple purpose engines used in, for example, power generators.

BACKGROUND ART

A reciprocating engine requires a crankshaft for converting the reciprocating motion of pistons in cylinders to rotational motion so as to extract power. Crankshafts are generally categorized into two classes: the type manufactured by die forging and the type manufactured by casting. Especially for multiple cylinder engines with two or more cylinders, the firstly mentioned die forged crankshafts, which are excellent in strength and stiffness, are often employed.

FIG. 1 is a schematic side view of an example of common crankshafts for multiple cylinder engines. A crankshaft 1 shown in FIG. 1 is designed to be mounted in a 4-cylinder engine and includes: five journals J1 to J5; four crank pins P1 to P4; a front part Fr, a flange Fl, and eight crank arms A1 to A8 (hereinafter also referred to simply as "arms") that connect the journals J1 to J5 and the crank pins P1 to P4 to each other. The crankshaft 1 is configured such that all of the eight crank arms A1 to A8 are formed integrally with counterweights W1 to W8 (hereinafter also referred to as "weights"), respectively, and is referred to as a 4-cylinder 8-counterweight. crankshaft.

Hereinafter, when the journals J1 to J5, the crank pins P1 to P4, the crank arms A1 to A8, and the counterweights W1 to W8 are each collectively referred to, the reference character "J" is used for the journals, "P" for the crank pins, "A" for the crank arms, and "W" for the counterweights. A crank pin P and a pair of crank arms A (including the counterweights W) which connect with the crank pin P are also collectively referred to as a "throw".

The journals J, the front part Fr, and the flange Fl are arranged coaxially with the center of rotation of the crankshaft 1. The crank pins P are arranged at positions eccentric with respect to the center of rotation of the crankshaft 1 by half the distance of the piston stroke. The journals J are supported by the engine block by means of sliding bearings and serve as the central rotational axis. The big end of a connecting rod (hereinafter referred to as "conrod") is coupled to the crank pin P by means of a sliding bearing, and a piston is coupled to the small end of the conrod.

In an engine, fuel explodes within cylinders. The combustion pressure generated by the explosion causes reciprocating motion of the pistons, which is converted into rotational motion of the crankshaft 1. In this regard, the combustion pressure acts on the crank pins P of the crankshaft 1 via the conrod and is transmitted to the journals J via the respective crank arms A connecting to the crank pins P. In this process, the crankshaft 1 rotates while repetitively undergoing elastic deformation.

The bearings that support the journals of the crankshaft are supplied with lubricating oil. In response to the elastic deformation of the crankshaft, the oil film pressure and the oil film thickness in the bearings vary in correlation with the bearing load and the journal center orbit. Furthermore, depending on the surface roughness of the journals and the surface roughness of the bearing metal in the bearings, not only the oil film pressure but also local metal-to-metal contact occurs. Ensuring a sufficient oil film thickness is important in order to prevent seizure of the bearings due to lack of lubrication and to prevent local metal-to-metal contact, thus affecting the fuel economy performance.

In addition, the elastic deformation accompanied with the rotation of the crankshaft and the movements of the center orbit of the journals within the clearances of the bearings cause an offset of the center of rotation, and therefore affect the engine vibration (mount vibration). Furthermore, the vibration propagates through the vehicle body and thus affects the noise in the vehicle and the ride quality.

In order to improve such engine performance properties, there is a need for a crankshaft having high stiffness with the ability to resist deformation. In addition, there is a need for weight reduction of the crankshaft.

A crankshaft is subjected to loads due to pressure in cylinders (combustion pressure in cylinders) and centrifugal force of rotation. In order to impart deformation resistance to the loads, an attempt is made to improve the torsional rigidity and the flexural rigidity of the crankshaft. In designing a crankshaft, the main specifications such as the journal diameter, the crank pin diameter, and the piston stroke are firstly determined. After determination of the main specifications, the remaining region to be designed is the shape of the crank arm. Thus, the design of the crank arm shape for increasing both the torsional rigidity and the flexural rigidity is an important requirement. Strictly speaking, as described above, the crank arms mean the oval portions connecting the journals and the pins to each other and do not include the portions serving as counterweights.

In the meantime, a crankshaft needs to have a mass distribution that ensures static balance and dynamic balance so as to be able to rotate kinematically smoothly as a rotating body. Accordingly, an important requirement is to adjust the mass of the counterweight region with respect to the mass of the crank arm region determined by the requirements for the flexural rigidity and torsional rigidity, in view of weight reduction while ensuring the static balance and dynamic balance.

For the static balance, the adjustment is made so that when the mass moment (the "mass" multiplied by the "radius of the center of mass") of the crank arm region and the counterweight region are summed, the result is zero. For the dynamic balance, the adjustment is made so that, when, for each region, the product of the axial distance from the reference point to the center of mass multiplied by the mass moment (the "mass" multiplied by the "radius of the center of mass" multiplied by the "axial distance") is determined using a point on the rotation axis of the crankshaft as the reference and the products are summed, the result is zero.

Furthermore, the balance ratio is adjusted for balancing against the load of combustion pressure within one throw (a region of the crankshaft corresponding to one cylinder). The balance ratio is defined as a ratio of the mass moment of the counterweight region to the mass moment of the crank arm region including the crank pin (and also including part of the conrod, strictly speaking) in the crankshaft, and this balance ratio is adjusted to fall within a certain range.

There is a trade-off between an increase in stiffness of the crank arm of a crankshaft and a reduction in weight thereof, but heretofore various techniques relating to the crank arm shape have been proposed in an attempt to meet both needs. Such conventional techniques include the following.

Japanese Patent No. 4998233 (Patent Literature 1) discloses a crank arm having intensively greatly depressed recess grooves in the crank pin-side surface of the crank arm and the journal-side surface thereof, on a straight line connecting the axis of the journal to the axis of the crank pin (hereinafter also referred to as a "crank arm centerline"). The crank arm disclosed in Patent Literature 1 is intended to achieve a reduction in weight and an increase in stiffness. The recess groove in the journal-side surface contributes to a reduction in weight by virtue of the reduced mass, and moreover, the thick region around the recess groove contributes to an increase in torsional rigidity. However, in reality, an increase in flexural rigidity cannot be substantially expected because of the intensively greatly depressed recess grooves on the crank arm centerline.

Japanese Translation of PCT International Application Publication No. 2004-538429 (Patent Literature 2), Japanese Translation of PCT International Application Publication No. 2004-538430 (Patent Literature 3), Japanese Patent Application Publication No. 2012-7726 (Patent Literature 4), and Japanese Patent Application Publication. No. 2010-230027 (Patent Literature 5) each disclose a crank arm having a greatly and deeply depressed hollow portion in the journal-side surface of the crank arm, on the crank arm centerline. The crank arms disclosed in Patent Literatures 2 to 5 are also intended to achieve a reduction in weight and an increase in torsional rigidity. However, in reality, the flexural rigidity is reduced because of the greatly and deeply depressed hollow portion on the crank arm centerline.

CITATION LIST

Patent Literature

Patent Literature 1: Japanese Patent No. 4998233
Patent Literature 2: Japanese Translation of PCT International Application Publication No. 2004-538429
Patent Literature 3: Japanese Translation of PCT International Application Publication No. 2004-538430
Patent Literature 4: Japanese Patent Application Publication No. 2012-7726
Patent Literature 5: Japanese Patent Application Publication No. 2010-230027

SUMMARY OF INVENTION

Technical Problem

With the techniques disclosed in Patent Literatures 1 to 5, it is possible to provide a crankshaft with a reduced weight and an increased torsional rigidity. However, the conventional techniques have their limits in increasing the flexural rigidity of a crankshaft, and therefore technological innovation therefor is strongly desired.

The present invention has been made in view of the above circumstances. An object of the present invention is to provide a crankshaft for reciprocating engines which has a reduced weight and an increased torsional rigidity in combination with an increased flexural rigidity.

Solution to Problems

A crankshaft for a reciprocating engine according to an embodiment of the present invention includes: journals that define a central axis of rotation; crank pins that are eccentric with respect to the journals; crank arms connecting the journals to the crank pins; and counterweights integrated with the crank arms. The crankshaft is to be mounted in a reciprocating engine.

Each of the crank arms has recesses in a surface adjacent to the crank pin, the recesses disposed inward of peripheral regions in both sides along an edge of the surface, the recesses disposed along the peripheral regions.

In the above-described crankshaft, the recesses may be connected together at a center of rotation of the crankshaft. The recesses may be connected together at a position shifted toward the crank pin from the center of rotation of the crankshaft. The recesses may be extended along an edge of the journal and connected together at a position shifted toward the counterweight from the center of rotation of the crankshaft.

In the crankshaft, it is preferred that the recesses are symmetric with respect to a line connecting an axis of the journal to an axis of the crank pin.

Advantageous Effects of Invention

According to the present invention, the crank arm has recesses in the surface adjacent to a crank pin. Thereby, the peripheral regions of the crank arm in both sides are thickened, and the regions inward thereof are thinned because of the recesses. Moreover, the central region further inward thereof is thickened. This configuration of the crank arm allows for a reduction in weight, an increase in torsional rigidity and an increase in flexural rigidity of the crankshaft.

BRIEF DESCRIPTION OF DRAWINGS

FIGS. 3(a) and 3(b) are schematic diagrams illustrating a method for evaluating the torsional rigidity of a crank arm, wherein FIG. 3(a) is a side view of a throw, and FIG. 3(b) is a front view thereof in the axial direction.

FIGS. 4(a) to 4(c) are diagrams showing typical examples in which the crank arm is assumed to be a simple circular plate from the standpoint of torsional rigidity in the sense of Strength of Materials, wherein FIG. 4(a) shows a circular plate having a rectangular cross section, FIG. 4(b) shows a circular plate having a projected cross section, and FIG. 4(c) shows a circular plate having a recessed cross section.

FIGS. 5(a) to 5(c) are diagrams showing typical examples in which the crank arm is assumed to be a simple beam from the standpoint of flexural rigidity in the sense of Strength of Materials, wherein FIG. 5(a) shows a beam having a rectangular cross section, FIG. 5(b) shows a beam having a projected cross section, and FIG. 5(c) shows a beam having a recessed cross section.

FIG. 6 is a graph summarizing the magnitude relationships between the beams having the respective cross-sectional shapes in the area moment of inertia and in the polar moment of inertia, which are directly related to flexural rigidity and torsional rigidity.

FIGS. 7(a) to 7(e) are schematic views showing an example of a crank arm shape in a crankshaft according to a first embodiment of the present invention, wherein FIG. 7(a) is a front view of the crank arm as seen from the crank pin in the axial direction, FIG. 7(b) is a cross-sectional view taken along the line A-A, FIG. 7(c) is a cross-sectional view taken along the line B-B, FIG. 7(d) is a cross-sectional view taken along the line C-C, and FIG. 7(e) is a cross-sectional view taken along the line D-D.

FIGS. 8(a) to 8(e) are schematic views showing an example of a crank arm shape in a crankshaft according to a second embodiment of the present invention, wherein FIG. 8(a) is a front view of the crank arm as seen from the crank pin in the axial direction, FIG. 8(b) is a cross-sectional view taken along the line E-E, FIG. 8(c) is a cross-sectional view taken along the line F-F, FIG. 8(d) is a cross-sectional view taken along the line G-G, and FIG. 8(e) is a cross-sectional view taken along the line H-H.

FIGS. 9(a) to 9(e) are schematic views showing an example of a crank arm shape in a crankshaft according to a third embodiment of the present invention, wherein FIG. 9(a) is a front view of the crank arm as seen from the crank pin in the axial direction, FIG. 9(b) is a cross-sectional view taken along the line I-I, FIG. 9(c) is a cross-sectional view taken along the line J-J, FIG. 9(d) is a cross-sectional view taken along the line K-K, and FIG. 9(e) is a cross-sectional view taken along the line L-L.

FIGS. 10(a) to 10(e) are schematic views showing an example of a crank arm shape in a crankshaft according to a fourth embodiment of the present invention, wherein FIG. 10(a) is a front view of the crank arm as seen from the crank pin in the axial direction, FIG. 10(b) is a cross-sectional view taken along the line M-M, FIG. 10(c) is a cross-sectional view taken along the line N-N, FIG. 10(d) is a cross-sectional view taken along the line O-O, and FIG. 10(e) is a cross-sectional view taken along the line P-P.

DESCRIPTION OF EMBODIMENTS

Embodiments of the crankshaft for a reciprocating engine according to the present invention will now be described.

Figure 1:
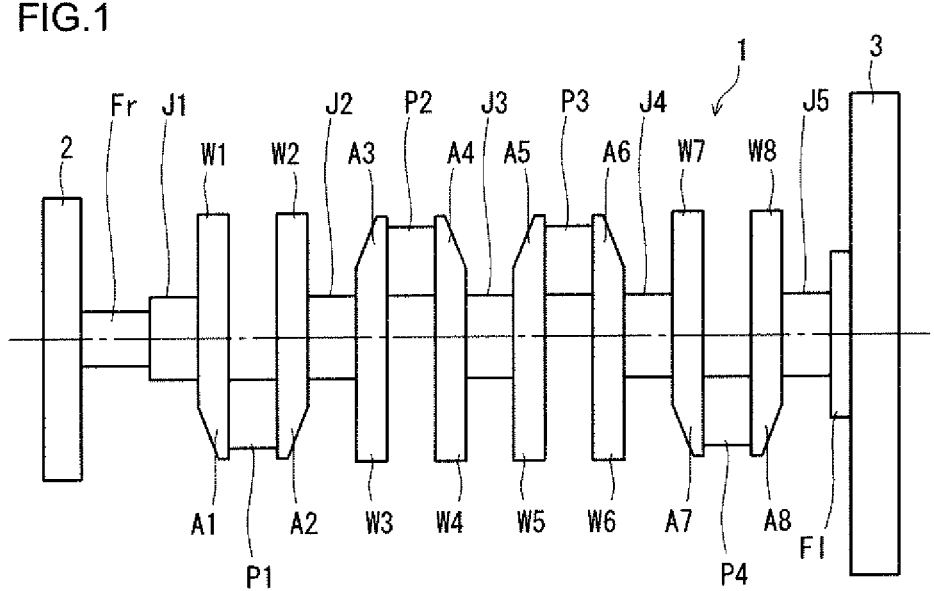
FIG. 1 is a schematic side view of an example of common crankshafts for multiple cylinder engines.
Figure 2:
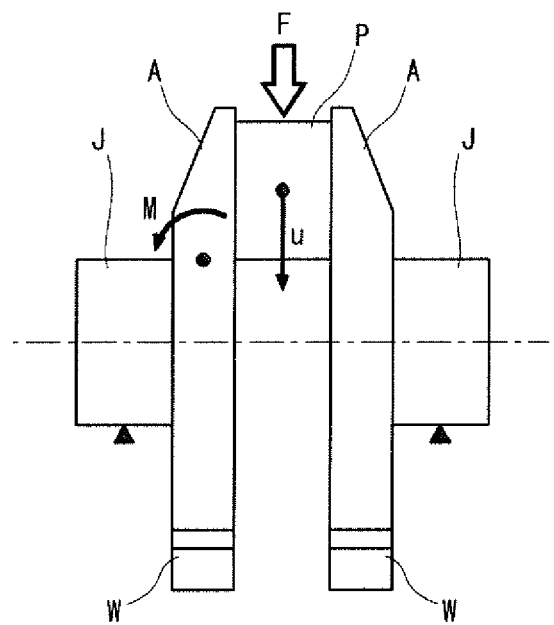
FIG. 2 is a schematic diagram illustrating a method for evaluating the flexural rigidity of a crank arm.

1. Basic Techniques to Consider in Designing Crankshaft 1-1. Flexural Rigidity of Crank Arm FIG. 2 is a schematic diagram illustrating a method for evaluating the flexural rigidity of a crank arm. As shown in FIG. 2, in each throw of the crankshaft, a load F of combustion pressure generated by the explosion in the cylinder is applied to the crank pin P via a conrod. Since the journals J at the both ends of each throw are supported by bearings, the load F is transmitted to the journal bearings from the crank pin P via the crank arms A. Thus, each of the crank arms A becomes subjected to a load of three-point bending, and a bending moment M acts on the crank arm A. Accordingly, in each crank arm A, compressive stress occurs at the outside in the thickness direction (the side adjacent to the journal J), and tensile stress occurs at the inside in the thickness direction (the side adjacent to the pin P).

In the case where the diameters of the crank pin P and the journal J have been determined as design specifications, the flexural rigidity of the crank arm A depends on the crank arm shape of each throw. The counterweight W seldom contributes to the flexural rigidity. The displacement u of the axial center of the crank pin P the direction in which the load of combustion pressure is applied is proportional to the load F of combustion pressure applied to the crank pin P and is inversely proportional to the flexural rigidity as shown in the following formula (1).

$$u \text{ proportional to } F/(\text{Flexural Rigidity}) \tag{1}$$

1-2. Torsional Rigidity of Crank Arm

Figure 3:
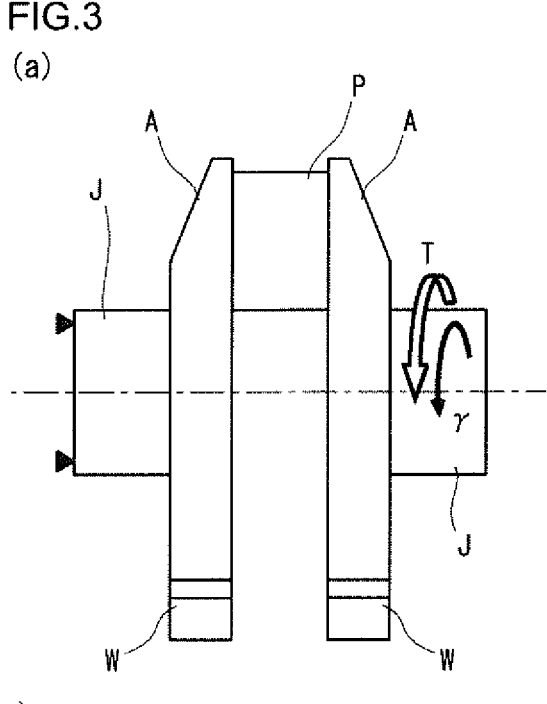
Figure 3:
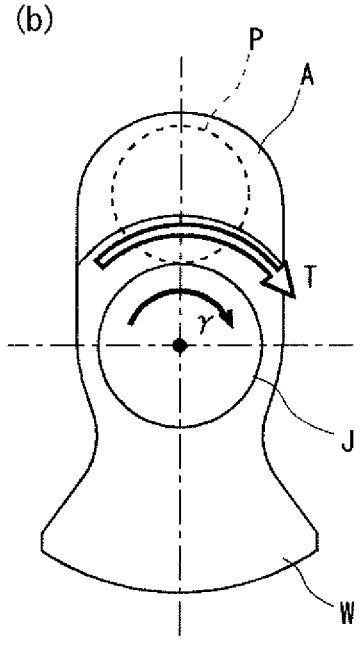

FIGS. 3(a) and 3(b) are schematic diagrams illustrating a method for evaluating the torsional rigidity of a crank arm. FIG. 3(a) is a side view of a throw, and FIG. 3(b) is a front view thereof in the axial direction. The crankshaft rotates about the journal J, which causes a torsional torque T as shown in FIGS. 3(a) and 3(b). Thus, it is necessary to enhance the torsional rigidity of the crank arm A in order to ensure smooth rotation against the torsional vibrations of the crankshaft without causing resonance.

In the case where the diameters of the crank pin P and the journal J have been determined as design specifications, the torsional rigidity of the crank arm A depends on the crank arm shape of each throw. The counterweight W seldom contributes to the torsional rigidity. The torsion angle y of the journal J is proportional to the torsional torque T and inversely proportional to the torsional rigidity as shown in the following formula (2).

$$Y \text{ proportional to } T/(\text{Torsional Rigidity}) \tag{2}$$

2. Crankshaft According to Present Invention 2-1. Approach for Increasing Stiffness of Crank Arm As stated above, the counterweight seldom contributes to the flexural rigidity and torsional rigidity. Accordingly, the present embodiment provides a crank arm shape that can achieve a reduction in weight and an increase in flexural rigidity in combination with an increase in torsional rigidity.

2-1-1. Shape for Increasing Torsional Rigidity

Here, an exemplary shape for increasing the torsional rigidity is studied based on the theory of Strength of Materials. For the crank arm A shown in FIGS. 3(a) and 3(b), an effective way to increase its torsional rigidity while maintaining a reduced weight is to increase its polar area moment of inertia.

Figure 4:
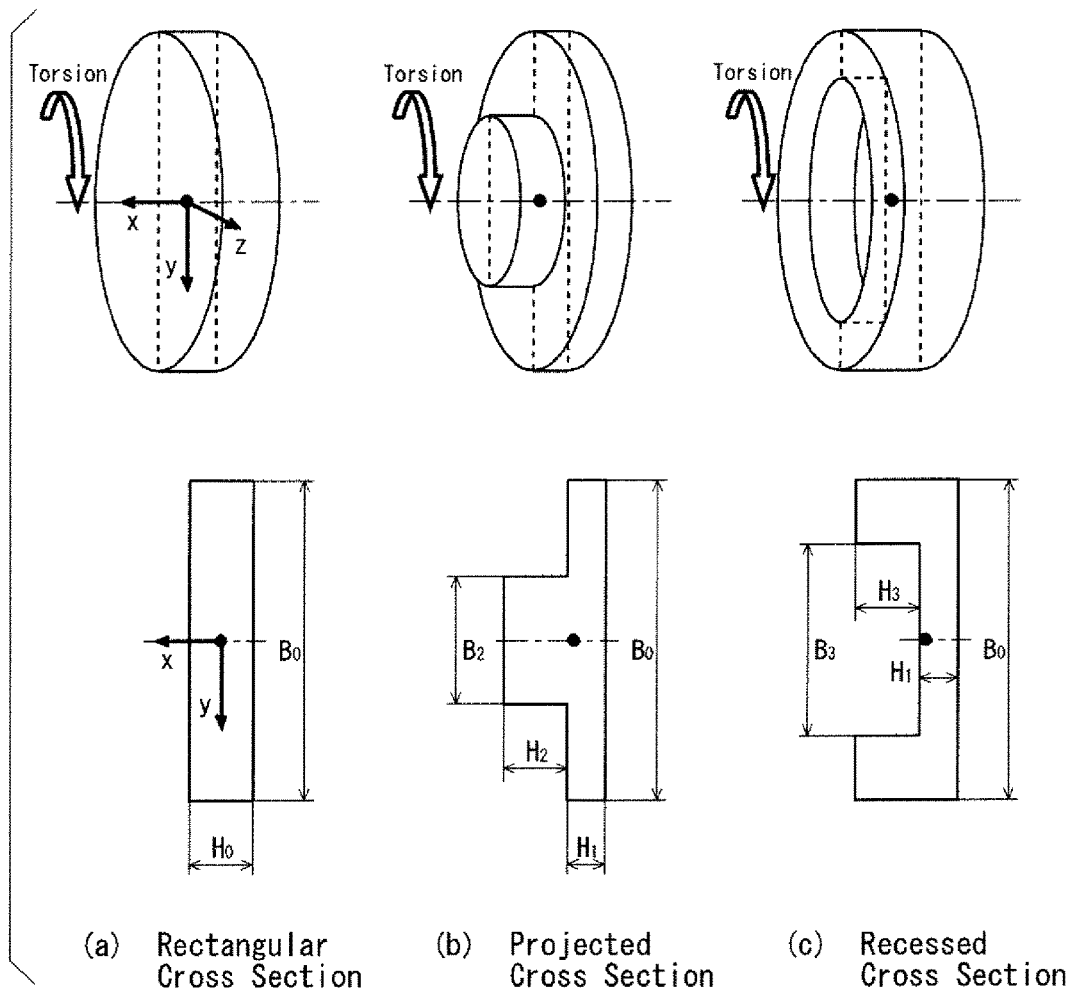

FIGS. 4(a) to 4(c) are diagrams showing typical examples in which the crank arm is assumed to be a simple circular plate from the standpoint of torsional rigidity in the sense of Strength of Materials, wherein FIG. 4(a) shows a circular plate having a rectangular cross section, FIG. 4(b) shows a circular plate having a projected cross section, and FIG. 4(c) shows a circular plate having a recessed cross section. The rectangular cross section type circular plate shown in. FIG. 4(a), the projected cross section type circular plate shown in FIG. 4(b), and the recessed cross section type circular plate shown in FIG. 4(c) are assumed to be of equal weight for the sake of maintenance of a reduced weight. In other words, these circular plates are of equal volume in spite of the varied cross sections in rectangular, projected, and recessed shapes.

Specifically, the rectangular cross section type circular plate shown in FIG. 4(a) has a rectangular cross-sectional shape, and has a thickness of $H_0$ and a diameter of $B_0$. The projected cross section type circular plate shown in FIG. 4(b) has a projected cross-sectional shape in which the central portion projects with respect to the outer peripheral portion, and the diameter of the outermost circumference of the circular plate is $B_0$. The projection in the central portion has a thickness of $H_2$ and a diameter of $B_2$, and the outer peripheral portion has a thickness of $H_1$. The recessed cross section type circular plate shown in FIG. 4(c) has a recessed cross-sectional shape in which the central portion is recessed with respect to the outer peripheral portion, and the diameter of the outermost circumference of the circular plate is $B_0$. The central portion has a thickness of $H_1$ with the recession having a depth of $H_3$ and having a diameter of $B_3$.

The magnitude relationship between the torsional rigidities of the respective circular plates is investigated under the condition that they are of equal weight. In general, according to the theory of Strength of Materials, there is a relationship between the torsional rigidity, the polar area moment of inertia, and the torsion angle as shown in the following formulae (3) to (5). The relationship shown in the formulae indicates that increasing the polar area moment of inertia is effective at increasing the torsional rigidity.

$$\text{Torsional rigidity: } G \times J/L \tag{3}$$

Polar area moment of inertia: $J=(\pi/32) \times d^4$ (4)

Torsion angle: $Y = T \times L/(G \times J)$ (5)

where L represents the axial length, G represents the modulus of rigidity, d represents the radius of the round bar, and T represents the torsional torque.

The condition that the three types of circular plates shown in FIGS. 4(a) to 4(c) are of equal weight means the condition that they are of equal volume. Accordingly, the relationship indicated by the following formula (6) is established among the dimensional parameters of the three types of circular plates.

$$(\pi/4) \times B_0 \times B_0 \times H_0 = (\pi/4) \times (B_0 \times B_0 \times H_1 + B_2 \times B_2 \times H_2) = (\pi/4) \times \{B_0 \times B_0 \times (H_1 + B_3) - B_3 \times B_3 \times H_3)\}$$ (6)

The polar area moments of inertia of the three types of circular plates are expressed by the following formulae (7) to (9), respectively, taking into account the thicknesses.

Polar area moment of inertia of a rectangular cross section type circular plate:

$$J_{(A)} = (\pi/32) \times H_1 \times B_0^4$$ (7)

Polar area moment of inertia of a projected cross section type circular plate:

$$J_{(B)} = (\pi/32) \times (H_1 \times B_0^4 + H_2 \times B_2^4)$$ (8)

Polar area moment of inertia of a recessed cross section type circular plate:

$$J_{(C)} = (\pi/32) \times \{(H_1 + H_3) \times B_0^4 - H_3 \times B_3^4\}$$ (9)

Based on the formulae (7) to (9), the magnitude relationship between the polar area moment of inertia $J_{(A)}$ of a rectangular cross section type circular plate, the polar area moment of inertia $J_{(B)}$ of a projected cross section type circular plate, and the polar area moment of inertia $J_{(C)}$ of a recessed cross section type circular plate is expressed by the following formula (10).

$$J_{(B)} < J_{(A)} < J_{(C)}$$ (10)

This formula (10) is the conclusion drawn theoretically from Strength of Materials. This conclusion can be understood from the observation in the sense of Strength of Materials that, qualitatively speaking, a cross-sectional shape in which materials are placed in greater proportion in locations farther from the torsion center provides a higher polar area moment of inertia.

For example, a case is considered as an illustrative example in which the dimensional parameters are set as follows so that the condition of equal weight, i.e., the condition of the above formula (6) can be satisfied: $B_0 = 100$ mm, $H_0 = 20$ mm, $H_1 = 10$ mm, $H_2 = H_3 = 20$ mm, and $B_2 = B_3 = 100/\sqrt{2} = 70.71$ mm.

In the case of this illustrative example, the polar area moment of inertia $J_{(A)}$ of a rectangular cross section type circular plate is determined as shown in the following formula (11) according to the above formula (7).

$$J_{(A)} = 1.96 \times 10^8$$ (11)

The polar area moment of inertia $J_{(B)}$ of a projected cross section type circular plate is determined as shown in the following formula (12) according to the above formula (8).

$$J_{(B)} = 1.47 \times 10^8$$ (12)

The polar area moment of inertia $J_{(C)}$ of a recessed cross section type circular plate is determined as shown in the following formula (13) according to the above formula (9).

$$J_{(C)} = 2.45 \times 10^8$$ (13)

The formulae (11) to (13) numerically confirm that the relationship expressed by the above formula (10) holds.

Thus, projected cross section type circular plates, rectangular cross section type circular plates, and recessed cross section type circular plates are in ascending order in magnitude of torsional rigidity against torsional loads, and therefore the shape of recessed cross section type circular plates is the most desirable.

2-1-2. Shape for Increasing Flexural Rigidity

Here, an exemplary shape for increasing the flexural rigidity is studied based on the theory of Strength of Materials. For the crank arm A shown in FIG. 2, an efficient way to increase its flexural rigidity while maintaining a reduced weight is to increase its area moment of inertia against bending.

Figure 5:
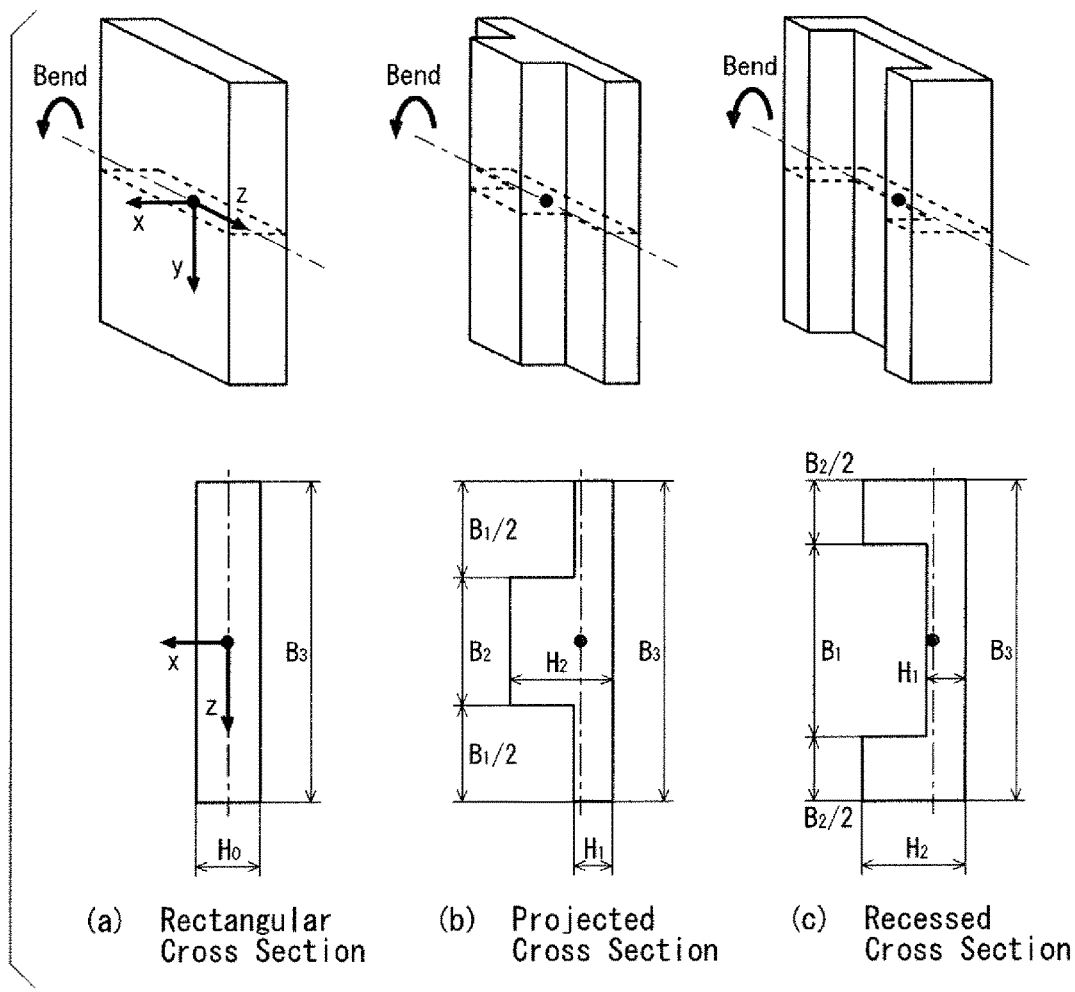

FIGS. 5(a) to 5(c) are diagrams showing typical examples in which the cross-sectional shape of the crank arm is simplified and the crank arm is assumed to be a simple beam from the standpoint of flexural rigidity in the sense of Strength of Materials, wherein FIG. 5(a) shows a beam having a rectangular cross section, FIG. 5(b) shows a beam having a projected cross section, and FIG. 5(c) shows a beam having a recessed cross section. The rectangular cross section type beam shown in FIG. 5(a), the projected cross section type beam shown in FIG. 5(b), and the recessed cross section type beam shown in FIG. 5(c) are assumed to be of equal weight for the sake of maintenance of a reduced weight. In other words, these beams are of equal cross-sectional area in spite of the varied cross sections in rectangular, projected, and recessed shapes.

Specifically, the rectangular cross section type beam shown in FIG. 5(a) has a rectangular cross-sectional shape, and has a thickness of Ho and a width of $B_3$. The projected cross section type beam shown in FIG. 5(b) has a projected cross-sectional shape in which the central portion projects with respect to the opposite side portions, and the maximum width of the beam is $B_3$. The central portion has a thickness of $H_2$ and a width of $B_2$, and the opposite side portions each have a thickness of $H_1$ and a width of $B_1/2$. The recessed cross section type beam shown in FIG. 5(c) has a recessed cross-sectional shape in which the central portion is recessed with respect to the opposite side portions, and the maximum width of the beam is $B_3$. The central portion has a thickness of $H_1$ and a width of $B_1$, and the opposite side portions each have a thickness of $H_2$ and a width of $B_2/2$.

The magnitude relationship between the stiffnesses of the respective beams against bending loads is investigated under the condition that they are of equal weight. In general, the relationship between the flexural rigidity of a rectangular beam and the area moment of inertia thereof is expressed by the following formulae (14) to (16) based on the theory of Strength of Materials. The relationship shown in the formulae indicates that increasing the area moment of inertia results in increasing the flexural rigidity.

Flexural Rigidity: $E \times I$ (14)

Area moment of inertia: $I = (1/12) \times b \times h^3$ (15)

Flexural displacement: $u = k(M/(E \times I))$ (16)

where b represents the width, h represents the thickness, E represents the Young's modulus, M represents the bending moment, and k represents the shape factor.

The condition that the three types of beams shown in FIGS. 5(a) to 5(c) are of equal weight means the condition that they are of equal volume, i.e., they are of equal cross-sectional area. Accordingly, the relationship indicated by the following formula (17) is established among the dimensional parameters of the three types of beams.

$$B_3 \times H_0 = (H_2 \times B_2 + B_1 \times H_1) = (H_2 \times B_2 + B_1 \times H_1) \quad (17)$$

The area moments of inertia of the three types of beams are expressed by the following formulae (18) to (20), respectively.

Area moment of inertia of a rectangular cross section type beam:

$$I_{(D)} = (1/12) \times B_3 \times H_0^3 \quad (18)$$

Area moment of inertia of a projected cross section type beam:

$$I_{(E)} = 1/3 \times (B_3 \times E_2^3 - B_1 \times H_3^3 + B_2 \times E_1^3) \quad (19)$$

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

Area moment of inertia of a recessed cross section type beam:

$$I_{(F)} = 1/3 \times (B_3 \times E_2^3 - B_1 \times H_3^3 + B_2 \times E_1^3) \quad (20)$$

where $E_2$ is determined by "$(B_2 \times H_2^2 + B_1 \times H_1^2)/\{2 \times (B_2 \times H_2 + B_1 \times H_1)\}$", $E_1$ is determined by "$H_2 - E_2$", and $H_3$ is determined by "$E_2 - H_1$".

The above formulae (19) and (20) are in the same form. This indicates that the area moment of inertia $I_{(E)}$ of a projected cross section type beam equals the area moment of inertia $I_{(F)}$ of a recessed cross section type beam under the condition that they are of equal weight.

In short, the magnitude relationship between the area moment of inertia $I_{(D)}$ of a rectangular cross section type beam, the area moment of inertia $I_{(E)}$ of a projected cross section type beam, and the area moment of inertia $I_{(F)}$ of a recessed cross section type beam is expressed by the following formula (21).

$$I_{(D)} < I_{(E)} = I_{(F)} \quad (21)$$

This formula (21) is the conclusion drawn theoretically from Strength of Materials. This conclusion can be understood from the observation in the sense of Strength of Materials that, qualitatively speaking, a cross-sectional shape such that materials are placed in greater proportion in locations farther from the neutral plane of bending provides a higher area moment of inertia.

For example, a case is considered as an illustrative example in which the dimensional parameters are set as follows so that the condition of the equal weight, i.e., the condition of the above formula (17) can be satisfied: $B_1 = B_2 = 50$ mm, $B_3 = 100$ mm, $H_0 = 20$ mm, $H_1 = 10$ mm, and $H_2 = 30$ mm, by which $E_1 = 12.5$ mm, $E_2 = 17.5$ mm, and $H_3 = 7.5$ mm.

In the case of this illustrative example, the area moment of inertia $I_{(D)}$ of a rectangular cross section type beam is determined as shown in the following formula (22) according to the above formula (18).

$$I_{(D)} = 6.67 \times 10^4 \quad (22)$$

The area moment of inertia $I_{(E)}$ of a projected cross section type beam is determined as shown in the following formula (23) according to the above formula (19).

$$I_{(E)} = 2.04 \times 10^5 \quad (23)$$

The area moment of inertia $I_{(F)}$ of a recessed cross section type beam is determined as shown in the following formula (24) according to the above formula (20).

$$I_{(F)} = 2.04 \times 10^5 \quad (24)$$

The formulae (22) to (24) numerically confirm that the relationship expressed by the above formula (21) holds.

Thus, projected cross section type beams and recessed cross section type beams have comparable flexural rigidities against bending loads, and therefore partially thickened crank arm shapes such as those of a projected cross section type beam and a recessed cross section type beam are preferable to the shape of a rectangular cross section type beam because such thickened crank arm shapes provide a higher flexural rigidity.

2-1-3. Summarization of Shapes for Increasing Flexural Rigidity and Torsional Rigidity FIG. 6 is a graph summarizing the magnitude relationships between the beams having the respective cross-sectional shapes in the area moment of inertia and in the polar moment of inertia, which are directly related to flexural rigidity and torsional rigidity. In FIG. 6, the polar moments of inertia and the area moments of inertia resulting from the cross sectional shapes shown in FIGS. 4(a) to 4(c) and FIGS. 5(a) to 5(c), i.e., the rectangular cross section, the projected cross section, and the recessed cross section, are presented as relative values assuming that the values of the rectangular cross section are the reference "1".

The results shown in FIG. 6 indicate that thickening the crank arm is an efficient way to increase both the flexural rigidity and the torsional rigidity. FIG. 6 shows that the projected cross-sectional shape results in an increase in flexural rigidity while the recessed cross-sectional shape results in an increase in torsional rigidity. Therefore, a combination of a projected shape and a recessed shape will result in both an increase in flexural rigidity and an increase in torsional rigidity.

2-2. Overview of Crankshaft According to Present Invention

As mentioned above, an efficient way to increase both the flexural rigidity and the torsional rigidity is to design the crank arm to have a cross-sectional shape that is a combination of a projected shape and a recessed shape. Specifically, the peripheral regions in both sides along the edge of the crank arm are configured to be thick, the regions inward of the peripheral regions are configured to be thin, and the central region further inward thereof (a region through which the crank arm centerline passes and which is adjacent to the journal) is configured to be thick. By configuring the peripheral regions, which are farther from the torsion center of the crank arm, to be thick and configuring the regions inward thereof to be thin, it is possible to ensure a high torsional rigidity while achieving a reduction in weight. The large thickness of the peripheral regions of the crank arm contributes to ensuring of the flexural rigidity. In addition, the large thickness of the central region of the crank arm contributes to ensuring of the flexural rigidity.

In light of these things, in a crankshaft of the present embodiment, a crank arm has recesses in the surface adjacent to the crank pin, and the recesses are disposed in regions inward of periphery regions in both sides along the edge of the surface, and are disposed along the peripheral regions. Accordingly, the peripheral regions of the crank arm outward of the recesses are thickened, and the regions inward of the peripheral regions are thinned because of the recesses. Further, the region inward of the recesses is thickened. Thereby, the crankshaft of the present embodiment has a reduced weight, an increased torsional rigidity and an increased flexural rigidity.

2-3. Specific Examples

[First Embodiment]

FIGS. 7(a) to 7(e) are schematic views showing an example of a crank arm shape in a crankshaft according to a first embodiment. FIG. 7(a) is a front view of the crank arm as seen from the crank pin in the axial direction, FIG. 7(b) is a cross-sectional view taken along the line A-A, FIG. 7(c) is a cross-sectional view taken along the line B-B, FIG. 7(d) is a cross-sectional view taken along the line C-C, and FIG. 7(e) is a cross-sectional view taken along the line D-D. The A-A cross section in FIG. 7(b) is a cross section along a crank arm centerline Ac. The B-B cross section in FIG. 7(c) is a cross section perpendicular to a crank arm centerline Ac and including the center of rotation of the crankshaft (the axis Jc of the journal). The C-C cross section in FIG. 7(d) is a cross section parallel to the B-B cross section and taken at a position shifted toward the crank pin from the center of rotation of the crankshaft. The D-D cross section in FIG. 7(e) is a cross section parallel to the B-B cross section taken at a position shifted toward the counterweight from the center of rotation of the crankshaft.

In the crank arm A of the first embodiment shown in FIG. 7(a) to 7(e), recesses 10 are made in the surface adjacent to the crank pin P and are symmetric with respect to the crank arm centerline Ac. Specifically, the crank arm A has peripheral regions 11 in both sides along the edge of the surface adjacent to the crank pin P. Inward of the peripheral regions 11, the recesses 10 are made along the respective peripheral regions 11. Thereby, the peripheral regions 11 in both sides of the crank arm A are thickened, and the regions inward of the peripheral regions 11 are thinned because of the recesses 10. Further, the central region inward of the recesses 10 is thickened. This configuration of the crank arm allows for a reduction in weight, an increase in torsional rigidity and an increase in flexural rigidity of the crankshaft.

[Second Embodiment]

FIGS. 8(a) to 8(e) are schematic views showing an example of a crank arm shape in a crankshaft according to a second embodiment. FIG. 8(a) is a front view of the crank arm as seen from the crank pin in the axial direction, FIG. 8(b) is a cross-sectional view taken along the line E-E, FIG. 8(c) is a cross-sectional view taken along the line F-F, FIG. 8(d) is a cross-sectional view taken along the line G-G, and FIG. 8(e) is a cross-sectional view taken along the line The E-E cross section, F-F cross section, G-G cross section and H-H cross section are cross sections of the crank arm shown by FIG. 8(a) taken at positions corresponding to the positions of the A-A cross section, B-B cross section, C-C cross section and D-D cross section of the crank arm shown by FIG. 7(a), respectively.

The crank arm A of the second embodiment shown in FIGS. 8(a) to 8(e) is based on the configuration of the crank arm A of the first embodiment shown in FIGS. 7(a) to 7(e), and is a variation thereof with a partially modified configuration. In the second embodiment, as shown in FIGS. 8(a) and 8(b), the recesses 10 formed in the surface of the crank arm A adjacent to the crank pin P are extended to the crank arm centerline Ac. Accordingly, the recesses 10 are connected together at the center of rotation of the crankshaft, that is, the axis Jc of the journal J.

In the crank arm A of the second embodiment, the peripheral regions 11 in both sides are thickened, and the regions inward of the peripheral regions 11 are thinned because of the recesses 10. Further, the central region inward of the recesses 10 is thickened. In the second embodiment, also, the recesses 10 disposed in both sides are connected together, and the area of the recesses 10 is large as compared with the first embodiment. Thus, the crank arm A of the second embodiment allows for a reduction in weight, an increase in torsional rigidity and an increase in flexural rigidity of the crankshaft as is the case with the first embodiment. The shape of the crank arm A of the second embodiment is effective especially for weight reduction of the whole crankshaft.

[Third Embodiment]

FIGS. 9(a) to 9(e) are schematic views showing an example of a crank arm shape in a crankshaft according to a third embodiment. FIG. 9(a) is a front view of the crank arm as seen from the crank pin in the axial direction, FIG. 9(b) is a cross-sectional view taken along the line FIG. 9(c) is a cross-sectional view taken along the line J-J, FIG. 9(d) is a cross-sectional view taken along the line K-K, and FIG. 9(e) is a cross-sectional view taken along the line L-L. The I-I cross section, J-J cross section, K-K cross section and L-L cross section are cross sections of the crank arm shown by FIG. 9(a) taken at positions corresponding to the positions of the A-A cross section, B-B cross section, C-C cross section and D-D cross section of the crank arm shown by FIG. 7(a), respectively.

The crank arm A of the third embodiment shown in FIGS. 9(a) to 9(e) is based on the configuration of the crank arm A of the first embodiment shown in FIGS. 7(a) to 7(e), and is a variation thereof with a partially modified configuration. In the third embodiment, as shown in FIGS. 9(a) and 9(b), the recesses 10 formed in the surface of the crank arm A adjacent to the crank pin P are connected together at a position shifted toward the crank pin P from the center of rotation of the crankshaft.

In the crank arm A of the third embodiment, the peripheral regions 11 in both sides are thickened, and the regions inward of the peripheral regions 11 are thinned because of the recesses 10. Further, the central region inward of the recesses 10 is thickened. In the third embodiment, also, the area of the recesses 10 is large as compared with the first embodiment. Thus, the crank arm A of the third embodiment has the same effects with the second embodiment.

[Fourth Embodiment]

FIGS. 10(a) to 10(e) are schematic views showing an example of a crank arm shape in a crankshaft according to a fourth embodiment. FIG. 10(a) is a front view of the crank arm as seen from the crank pin in the axial direction, FIG. 10(b) is a cross-sectional view taken along the line M-M, FIG. 10(c) is a cross-sectional view taken along the line N-N, FIG. 10(d) is a cross-sectional view taken along the line O-O, and FIG. 10(e) is a cross-sectional view taken along the line P-P. The M-M cross section, N-N cross section, O-O cross section and P-P cross section are cross sections of the crank arm shown by FIG. 10(a) taken at positions corresponding to the positions of the A-A cross section, B-B cross section, C-C cross section and D-D cross section of the crank arm shown by FIG. 7(a), respectively.

The crank arm A of the fourth embodiment shown in FIGS. 10(a) to 10(e) is based on the configuration of the crank arm A of the first embodiment shown in FIGS. 7(a) to 7(e), and is a variation thereof with a partially modified configuration. In the fourth embodiment, as shown in FIGS. 10(a) and 10(b), the recesses 10 formed in the surface of the crank arm A adjacent to the crank pin P are connected together at a position shifted toward the counterweight W from the center of rotation of the crankshaft. Especially in the case shown by FIGS. 10(a) to 10(e), the recesses 10 are extended along the edge of the journal J and are connected together.

In the crank arm A of the fourth embodiment, the peripheral regions 11 in both sides are thickened, and the regions inward of the peripheral regions 11 are thinned because of the recesses 10. Further, the central region inward of the recesses 10 is thickened. In the fourth embodiment, also, the area of the recesses 10 is large as compared with the first embodiment. Thus, the crank arm A of the third embodiment has the same effects with the second and third embodiments.

The present invention is applicable to crankshafts to be mounted in a variety of reciprocating engines. Specifically, the engine may have any number of cylinders, for example, two cylinders, three cylinders, four cylinders, six cylinders, eight cylinders or ten cylinders, and even more cylinders. The cylinder arrangement may be of any type, for example, in-line type, V-type, opposed type or the like. The fuel for the engine may be of any kind, for example, gasoline, diesel, biofuel or the like. Also, the engines include a hybrid engine consisting of an internal-combustion engine and an electric motor.

INDUSTRIAL APPLICABILITY

The present invention is capable of being effectively utilized in crankshafts to be mounted in a variety of reciprocating engines.

DESCRIPTION OF REFERENCE SYMBOLS

1: crankshaft
J, J1 to J5: journal
Jc: axis of journal
P, P1 to P4: crank pin
Pc: axis of crank pin
Fr: front part
Fl: flange
A, A1 to A5: crank arm
Ac: crank arm centerline
W, W1 to W8: counterweight
2: damper pulley
3: flywheel
10: recess
11: peripheral region

The invention claimed is:

1. A crankshaft for a reciprocating engine, the crankshaft comprising:
   journals that define a central axis of rotation;
   crank pins that are eccentric with respect to the journals;
   crank arms connecting the journals to the crank pins; and
   counterweights integrated with the crank arms,
   wherein the journals, the crank pins, the crank arms, and the counterweights are integrated into a seamless body,
   wherein the crankshaft is to be mounted in a reciprocating engine; and
   wherein each of the crank arms has a first recess and a second recess in a surface adjacent to the crank pin, the first recess and the second recess spaced apart from each other and disposed inward of peripheral regions in both sides along an edge of the surface, the peripheral regions are thicker than the first and second recesses, the first recess and the second recess disposed along the peripheral regions, thereby making a central region inward of the first recess and the second recess thick.

2. The crankshaft for a reciprocating engine according to claim 1, wherein the first recess and the second recess are symmetric with respect to a line connecting an axis of the journal to an axis of the crank pin.

3. A crankshaft for a reciprocating engine, the crankshaft comprising:
   journals that define a central axis of rotation;
   crank pins that are eccentric with respect to the journals;
   crank arms connecting the journals to the crank pins; and
   counterweights integrated with the crank arms,
   wherein the crankshaft is to be mounted in a reciprocating engine; and
   wherein each of the crank arms has a first recessed portion and a second recessed portion in a surface adjacent to the crank pin, the first recessed portion and the second recessed portion disposed inward of peripheral regions in both sides along an edge of the surface, each of the first and second recessed portions including a free end portion, which is disposed outward of an edge of the journal and between an axis of the crank pin and the central axis of rotation when viewed from a direction along the central axis of rotation, the peripheral regions are thicker than the first and second recessed portions, the first recessed portion and the second recessed portion disposed along the peripheral regions, thereby making a central region inward of the first recessed portion and the second recessed portion thick, wherein the first recessed portion and the second recessed portion are connected together at a center of rotation of the crankshaft so as to form a u-shaped recess.

4. The crankshaft for a reciprocating engine according to claim 3, wherein the first recessed portion and the second recessed portion are symmetric with respect to a line connecting an axis of the journal to the axis of the crank pin.

5. A crankshaft for a reciprocating engine, the crankshaft comprising:
   journals that define a central axis of rotation;
   crank pins that are eccentric with respect to the journals;
   crank arms connecting the journals to the crank pins; and
   counterweights integrated with the crank arms,
   wherein the crankshaft is to be mounted in a reciprocating engine; and
   wherein each of the crank arms has a first recessed portion and a second recessed portion in a surface adjacent to the crank pin, the first recessed portion and the second recessed portion disposed inward of peripheral regions in both sides along an edge of the surface, each of the first and second recessed portions including a free end portion, which is disposed outward of an edge of the journal and between an axis of the crank pin and the central axis of rotation when viewed from a direction along the central axis of rotation, the peripheral regions are thicker than the first and second recessed portions, the first recessed portion and the second recessed portion disposed along the peripheral regions, thereby making a central region inward of the first recessed portion and the second recessed portion thick, wherein the first recessed portion and the second recessed portion are connected together at a position shifted toward the crank pin from a center of rotation of the crankshaft so as to form a u-shaped recess.

6. The crankshaft for a reciprocating engine according to claim 5, wherein the first recessed portion and the second recessed portion are symmetric with respect to a line connecting an axis of the journal to the axis of the crank pin.

7. A crankshaft for a reciprocating engine, the crankshaft comprising:
   journals that define a central axis of rotation;
   crank pins that are eccentric with respect to the journals;
   crank arms connecting the journals to the crank pins; and
   counterweights integrated with the crank arms,
   wherein the crankshaft is to be mounted in a reciprocating engine; and
   wherein each of the crank arms has a first recessed portion and a second recessed portion in a surface adjacent to the crank pin, the first recessed portion and the second recessed portion disposed inward of peripheral regions in both sides along an edge of the surface, each of the first and second recessed portions including a free end portion, which is disposed outward of an edge of the journal and between an axis of the crank pin and the central axis of rotation when viewed from a direction along the central axis of rotation, the peripheral regions are thicker than the first and second recessed portions, the first recessed portion and the second recessed portion disposed along the peripheral regions, thereby making a central region inward of the first recessed portion and the second recessed portion thick, wherein the first recessed portion and the second recessed portion are extended along the edge of the journal and are connected together at a position shifted toward the counterweight from a center of rotation of the crankshaft so as to form a u-shaped recess.

8. The crankshaft for a reciprocating engine according to claim 7, wherein the first recessed portion and the second recessed portion are symmetric with respect to a line connecting an axis of the journal to the axis of the crank pin.

* * * * *